United States Patent [19]

Brown

[11] 4,437,243

[45] Mar. 20, 1984

[54] GYROSCOPIC INSTRUMENT

[75] Inventor: Robert L. Brown, Buena Park, Calif.

[73] Assignee: AMF Incorporated, White Plains, N.Y.

[21] Appl. No.: 235,931

[22] Filed: Feb. 20, 1981

[51] Int. Cl.³ .................. G01C 19/38; G01C 19/28; G01C 19/26

[52] U.S. Cl. ........................... 33/302; 33/304; 33/312; 33/321; 74/5.6 A

[58] Field of Search .................. 33/304, 302, 312, 321, 33/324, 318; 74/5.6 A, 5.1, 5.2

[56] References Cited

U.S. PATENT DOCUMENTS

| | | | |
|---|---|---|---|
| 2,954,700 | 10/1960 | Des Champs | 74/5.6 A X |
| 3,473,391 | 10/1969 | Williamson et al. | 74/5.1 |
| 3,791,043 | 2/1974 | Russell . | |
| 3,798,976 | 3/1974 | Lindsey et al. . | |
| 3,813,949 | 6/1974 | Rodgers | 74/5.6 A |
| 3,862,499 | 1/1975 | Isham et al. . | |
| 3,915,019 | 10/1975 | Zoltan | 74/5.6 A |
| 3,968,691 | 7/1976 | Balkanli . | |
| 4,130,942 | 12/1978 | Lapeyre . | |
| 4,197,654 | 4/1980 | Van Steenwyk et al. | 33/321 |
| 4,199,869 | 4/1980 | Van Steenwyk | 33/324 |

Primary Examiner—William D. Martin, Jr.
Attorney, Agent, or Firm—David E. Dougherty; John H. Gallagher

[57] ABSTRACT

An instrument including a gyroscopic rotor mounted to precess about a predetermined axis in response to pivotal movement of the rotor about a sensing axis, with the rate of precession being measured and being utilized to determine the amount of said pivotal movement above the sensing axis. Two or more such rotors precessing about different axes can respond to different components of the earth's rotational movement, or to other component movements or torques. Differences in the rates of precession of the two rotors indicate the relative strengths of the corresponding components of the earth's movement, and afford a basis for deriving an indication of azimuth.

21 Claims, 6 Drawing Figures

U.S. Patent  Mar. 20, 1984  Sheet 3 of 3  4,437,243
FIG. 5
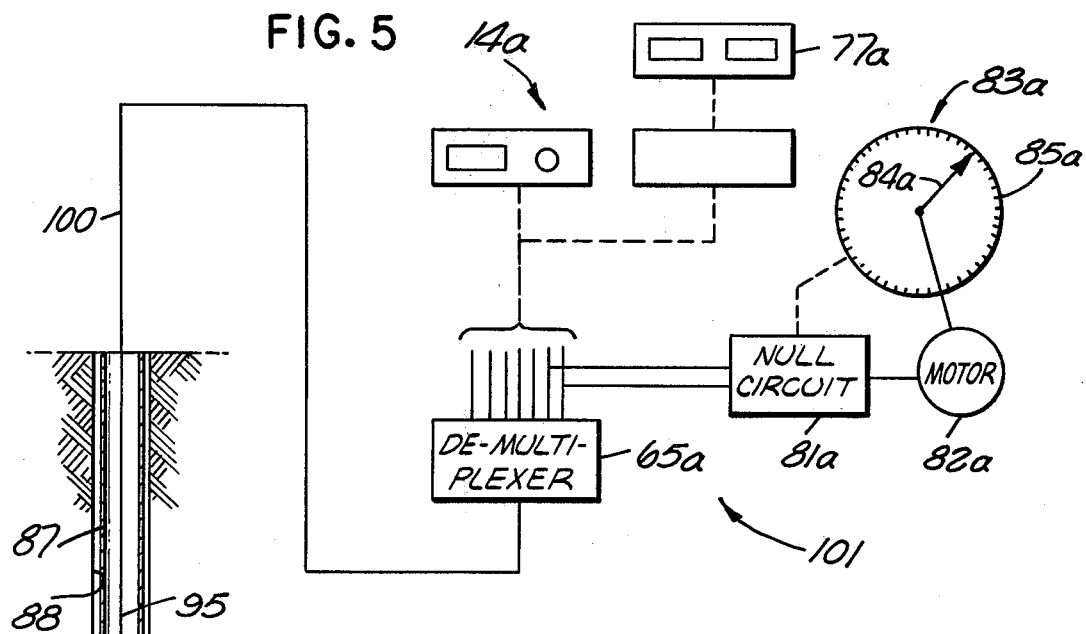
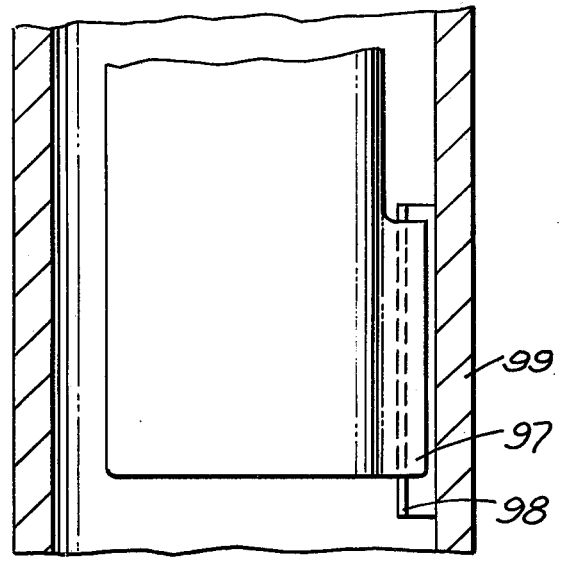
FIG. 6
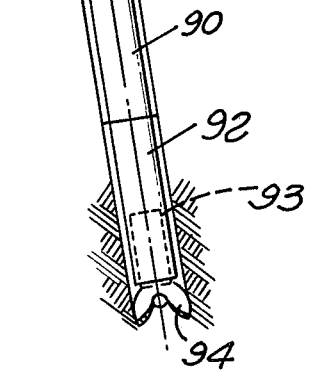
FIG. 4

GYROSCOPIC INSTRUMENT

BACKGROUND OF THE INVENTION

This invention relates to improved instruments of a type utilizing gyroscopes to produce a directional indication or response. The invention will be described primarily as applied to well instruments, such as surveying instruments or steering tools in which gyroscopic means are provided for indicating azimuth. It is to be understood, however, that certain aspects of the invention are also applicable to equipment usable at locations other than in a well.

In cased wells and in some other types of wells where it is not possible to utilize magnetic sensors responsive to the earth's magnetic field, gyroscopic units are employed for indicating azimuth. Difficulties are encountered, however, in assuring maintenance of an accurately reliable heading of a gyroscope during the often substantial period of time required for lowering the instrument into a well, and in preventing unwanted variations in the heading as a result of friction of the bearings of the gyroscope, slight imperfections in manufacture, and other uncontrollable factors.

SUMMARY OF THE INVENTION

An instrument embodying the present invention incorporates a novel gyroscopic arrangement functioning on a principle which eliminates many of the possible sources of operational error inherent in most conventional gyroscopic devices. The invention avoids the necessity for accurately presetting a gyroscope rotor to a predetermined heading, and maintaining that heading with precision until the desired readings can be taken. When employed in a well instrument, the invention eliminates the usual requirement that the gyroscope be accurately preset to a predetermined North-South or other heading while the instrument is at the surface of the earth, and be maintained precisely in that position during lowering of the tool to the depth at which readings are to be taken.

To accomplish this result, the invention utilizes a gyroscopic rotor which is mounted to a carrier body for pivotal movement therewith about a predetermined sensing axis, and which is free to precess relative to the body about another axis in response to such pivotal movement about the sensing axis. The rate of precession is then measured and utilized to derive the amount of movement of the body about the sensing axis. Two such rotors may be mounted to precess about two different axes in response to different component motions of the carrier body.

In the presently preferred form of the invention, two or more gyroscopic rotors are mounted to a carrier body to precess in response to rotary motions produced by two different components respectively of the earth's rotational movement, with the rate of precessing movement of each rotor acting as an indication of the strength of a corresponding one of those components. The two rotors may be caged during lowering of the instrument into a well, and then be simultaneously released for precessing movement when a directional reading is to be taken, so that the rates of precession can be compared to give the desired directional information from which azimuth can be determined. Gravity actuated sensing elements may be employed in association with the rotors, having axes corresponding to those of the rotors, so that the overall instrument can give information as to both inclination of the instrument body and the direction of that inclination.

In instruments which are to be utilized primarily in a vertical or generally vertical well, the spin axes of the two rotors may be located to extend longitudinally of the body of the instrument and the well. Where readings are required also in holes extending horizontally or nearly horizontally, additional gyroscopic rotors may be provided having their spin axes disposed transversely of the instrument body.

One preferred arrangement for responding to or measuring the rate of precession of the rotors is to provide each rotor with markings which are spaced circularly about the spin axis of the rotor and whose rotation is sensed by optical scanning means such as a light source and photo-electric cell. The markings may consist of alternately reflective and non-reflective areas, forming a pattern acting to control optically the development of an output signal of repeating electrical pulses or oscillations at a rate determined by the speed of rotation of the rotor and the spacing of the reflective and non-reflective areas. The optical scanning means may be responsive to attainment of a predetermined angle of precession of the rotor at which the pattern of reflective and non-reflective areas moves beyond the region in which the optical scanning means can produce the repeating pulses or oscillations. The interval of time required to reach this point indicates the rate of precession of the corresponding rotor.

BRIEF DESCRIPTION OF THE DRAWINGS

The above and other features and objects of the invention will be better understood from the following detailed description of the typical embodiments illustrated in the drawings, in which:

FIG. 4 is a fragmentary section taken on line 4—4 of FIG. 2;

FIG. 5 is a diagrammatic representation of a variational form of the invention utilized as a steering tool for a drill string; and FIG. 6 is an enlarged fragmentary representation of a portion of FIG. 5.

DESCRIPTION OF THE PREFERRED EMBODIMENTS

Figure 1:
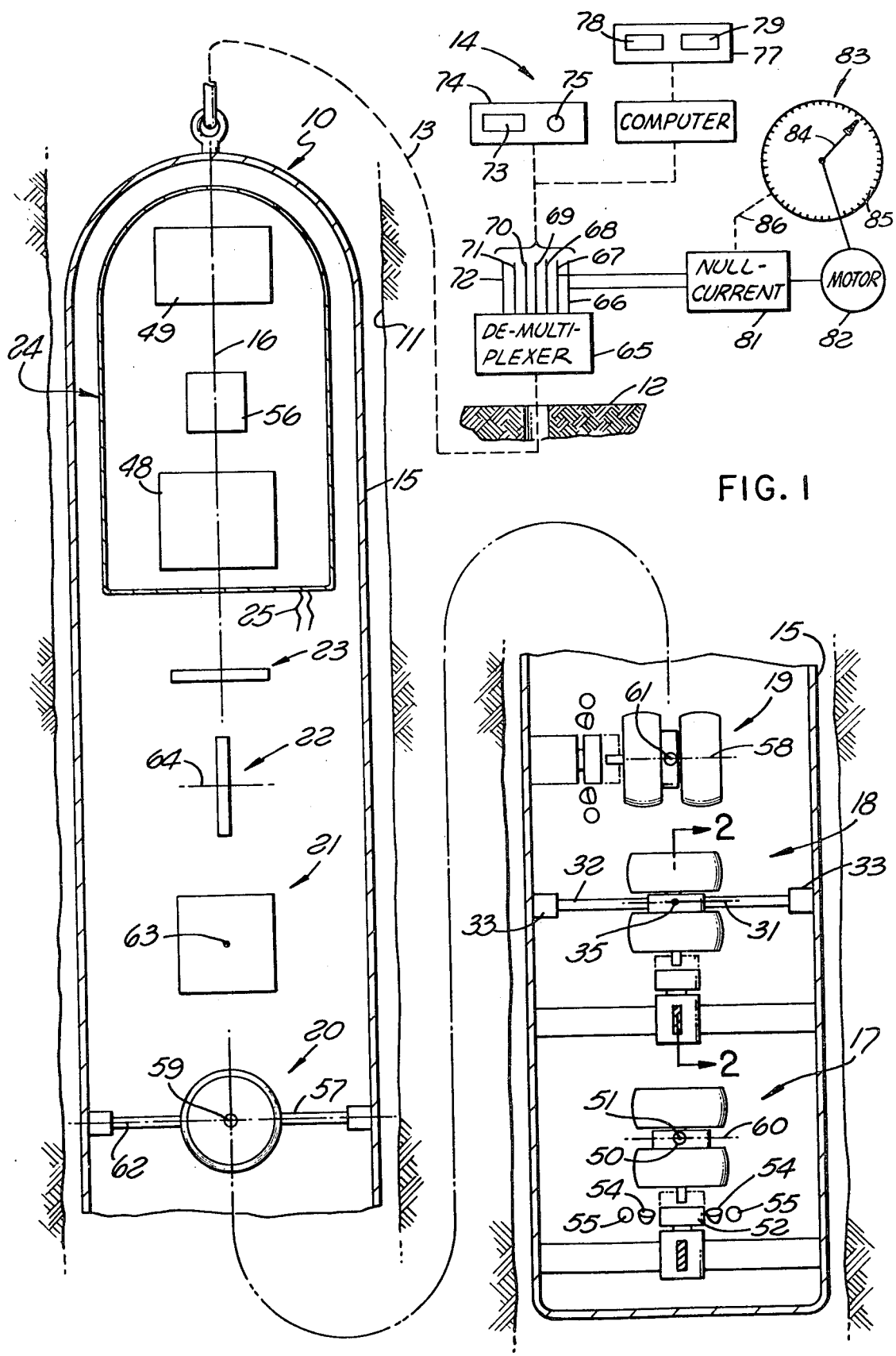
FIG. 1 is a somewhat diagrammatic representation of a well surveying instrument constructed in accordance with the invention.

The well surveying apparatus illustrated in FIG. 1 includes an instrument or probe 10 which is lowerable into a well bore 11 from the surface 12 of the earth on a wire line 13 which may act both to suspend the instrument in the well and conduct signals from instrument 10 to the surface readout equipment represented at 14. Probe 10 includes an elongated hollow body or case 15, which is preferably fluid tight and adapted to withstand the pressures and temperatures encountered in the well, and which may be cylindrical about a longitudinal axis 16 of the probe and of a diameter to fit fairly closely within the well bore so that the longitudinal axis 16 of the probe is aligned with the longitudinal axis of the portion of the well within which the probe is located. If desired, centering means may be provided about the probe to assure its effective alignment with the well axis.

Case 15 of the probe contains at least two gyroscope assemblies 17 and 18, and preferably two additional gyroscope assemblies 19 and 20 if the instrument is on some occasions to be utilized in near-horizontal wells. In addition, case 15 also contains at least two gravity responsive sensors 21 and 22, and preferably also a third gravity sensor 23 if the device is to be utilized in near-horizontal wells. These various gyroscopic and gravity sensors 17 through 23 may be energized by batteries contained within case 15 or by electricity delivered downwardly from the surface of the earth through line 13. Electrical signals developed by the sensors may be delivered to an electronic unit 24 within case 15 through conductors 25 having sufficient flexibility to avoid interference with movement of the sensing elements as required to perform their sensing functions.

The four gyroscopic units 17, 18, 19 and 20 may be essentially identical except with respect to their orientation within and relative to case 15, to respond to torques applied to the units through the case about different axes. In view of the similarity of the gyroscope assemblies, only one has been shown in detail, specifically the gyroscope 18, whose construction will be understood by reference to FIGS. 1 and 2. As seen in those figures, assembly 18 includes at least one gyroscopic mass or wheel which is driven rotatively at a high and constant rate of speed about a spin axis 26. The drawing typically illustrates assembly 18 as including two such gyroscope wheels 27 and 28 connected rigidly to and rotating with a common mounting shaft 29, which is journalled within a bearing 30 to locate the wheels and shaft for rotation about the desired axis 26. The bearing and the rotating parts are mounted for pivotal movement about an axis 31 extending perpendicular to and intersecting longitudinal axis 16 of the probe and also extending perpendicular to and intersecting spin axis 26 of the gyroscopic assembly. In the FIGS. 1 and 2 position of assembly 18, the spin axis 26 is aligned with longitudinal axis 16 of the probe. The mounting of assembly 18 for its pivotal movement about transverse axis 31 is effected by provision of an axle structure 32 (FIG. 1) extending along axis 31, typically formed of two aligned sections rigidly secured to and projecting in opposite directions from the outer race of bearing 30. These two sections of the axle structure 32 may be externally cylindrical and have their opposite ends journalled rotatably within a pair of aligned bearing sleeves 33 secured rigidly to the side wall of case 15 and centered about axis 31. A motor 34 associated with the gyroscopic wheels 27 and 28, and typically contained within one of those wheels, may have its case 134 appropriately secured to one or both of the axle elements 32 and to bearing 30 and have its armature 234 connected to shaft 29 to spin the wheels 27 and 28 within bearing 30 and at a predetermined and accurately controlled speed. The connection between the motor and the axle elements may typically be made in the manner illustrated in FIG. 4, by providing case 134 of the motor with an annular end portion 334 within which the outer race of bearing 30 is a tight friction fit, and by connecting the inner ends of axle elements 32 in fixed relation into aligned diametrically opposed openings 132 in case portion 334.

Gyroscope assembly 18 is adapted to sense and respond to pivotal movement of assembly 18 with case 15 about an axis 35 extending perpendicular to and intersecting axes 16 and 31. Such pivotal movement of the case about axis 35 relative to inertial space is caused by one component of the earth's rotation and acts to move one end of axle 32 of the gyroscope rotor (as viewed in FIG. 1) downwardly, and the other end upwardly by reason of the reception of the ends of the axle within sleeves 32 and 33 fixed to case 15. This rotation is transmitted from axle 32 through bearing 30 to shaft 29 and the gyro wheels 27 and 28, and causes pivotal precessing movement of wheels 27 and 28, shaft 29, bearing 30 and axle 32 about axis 31 and within sleeves 33. The rate and direction of that precessing movement depends upon the rate and direction of rotation applied to case 15 about the sensing axis 35 of assembly 18.

Figure 2:
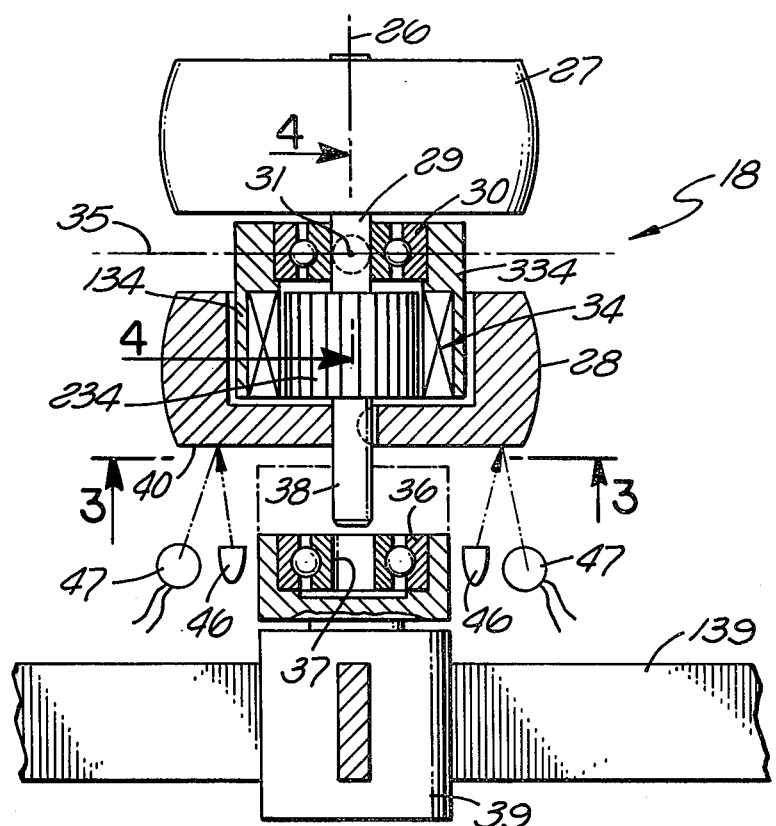
FIG. 2 is an enlarged axial section through one of the gyro assemblies taken on line 2—2 of FIG. 1.

The rate of precession of assembly 18 about axis 31 is measured by first caging the rotary elements in their FIG. 2 position of alignment with the main longitudinal axis 16 of probe 10, and then releasing the rotating elements to precess, while measuring the time required to precess through a predetermined angle from the initial position. Retention of the rotary elements in their axially extending position is effected by a caging bearing 36, which may take the form of a ball bearing having an inner race containing a cylindrical central recess 37 dimensioned to exactly receive a projecting end 38 of the shaft 29 of the rotating gyroscopic structure. Bearing 36 is movable axially between the broken line position of FIG. 2 in which it holds the gyroscopic wheels in their axially extending position and the full line position of FIG. 2 in which the wheels are free for precessing movement about axis 31. Any appropriate means for thus actuating the caging element 36 between its holding and released positions may be utilized, such as a solenoid 39 mounted to case 15 by support arms 139 and controllable from the surface of the earth to actuate element 36.

To produce a signal indicating when shaft 29 and its carried gyroscope wheels 27 and 28 have pivoted about axis 31 through a predetermined angle, there may be formed on an end face 40 of wheel 28, which face is disposed transversely of spin axis 26, a pattern 41 of segmentally shaped light areas 42 and intermediate dark areas 43, or other alternately reflective and non-reflective areas, or any other type of visually differing areas. The light and dark areas are desirably all of the same angular extent about the spin axis 26. The dark areas may all terminate at arcuately extending radially outer edges 44 of a common diameter with respect to axis 26, with an uninterrupted annular light area 45 being provided outwardly beyond the edges 44 of the dark areas.

At two diametrically opposite locations, a pair of narrow beam light sources 46 aim localized light beams toward the end face 40 of wheel 28, with adjacent photoelectric cells 47 being positioned to receive light from the sources 46 reflected by end face 40. As will be understood from FIG. 2, light sources 46 and photoelectric cells 47 lie essentially within a plane containing axes 35 and 16, and therefore within the plane of pivotal precessing movement of spin axis 26 about axis 31. As wheel 28 and its patterned end face 40 rotate rapidly, with the light beams from sources 46 striking the alternate dark and light areas 41 and 42, photoelectric cells 47 act to produce intermittent electrical pulses in a square wave form whose frequency is dependent upon the rate of rotation of the gyroscope wheels. This square wave is delivered to a timing circuit 48 in electronic package 24, which commences a timing interval when caging element 36 is withdrawn from engagement with pin 38, and terminates the timing interval when the wheel 28 and its end face 40 have precessed to a point at which the light which is emitted by either of the sources 46 and received by the associated photocell strikes end face 40 radially beyond the peripheral edges 44 of the dark areas 43 on face 40. When that point is reached, the light reflected by face 40 is no longer intermittent, but rather is continuous since the light from the associated source now strikes the annular peripheral area 45 of end face 40. Timing circuit 48 responds to such development of a continuous output by either of the photoelectric cells to terminate the timing. The circuitry of electronic package 24 produces a signal representing the duration of the timed interval, and delivers that signal to the surface of the earth in multiplex fashion in conjunction with signals from the other sensing elements. In FIG. 1, the multiplexing circuit is represented diagrammatically at 49.

Figure 3:
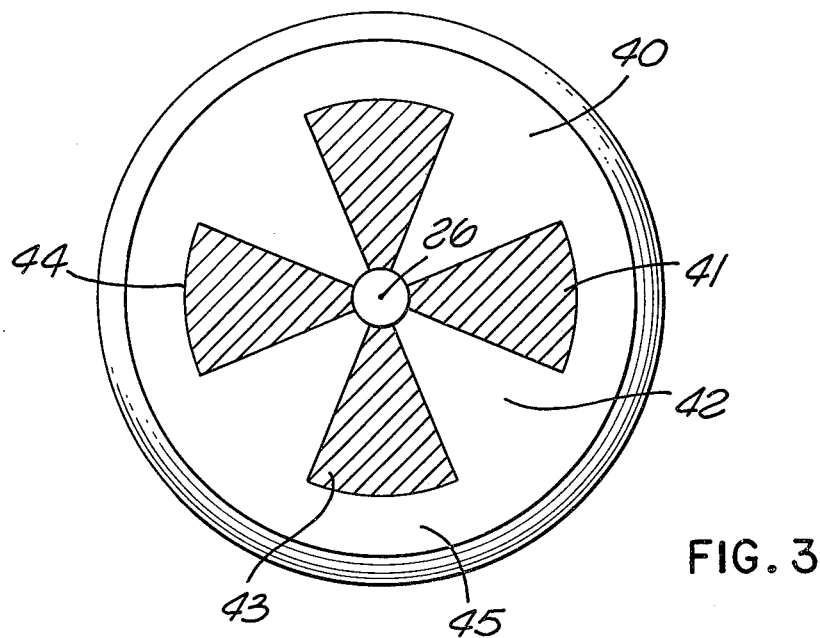
FIG. 3 is a view taken on line 3—3 of FIG. 2.

Gyroscope assembly 17 is identical with the above discussed assembly 18 except that the axle 50 of assembly 17 corresponding to axle 32 of assembly 18 extends perpendicular to the plane of the paper in FIG. 1 rather than parallel to that plane. The axis of pivotal precession of the rotary wheels of gyroscope assembly 17 is then the axis 51 of axle 50 and is disposed perpendicular to and intersects main axis 16 of the probe. A caging bearing 52 is operable by a solenoid or other actuating element 53 to initially hold the rotary elements of gyroscope assembly 17 in a position in which their spin axis is aligned with axis 16 of the probe, and then release the rotating elements for precessing movement about axis 51. Lamps 54 and photoelectric cells 55 sense the movement and determine when the parts have precessed through a predetermined angle as discussed in connection with assembly 18, with an associated timing unit 48 in electronic package 24 acting to time the duration of the precessing movement to a point at which one of the photoelectric cells receives light reflected from a location beyond an alternately light and dark area on an end face of the rotating structure corresponding to that shown in FIG. 3.

Gyro assemblies 19 and 20 may be constructed essentially the same as assemblies 17 and 18, but with the spin axes 58 and 59 of these assemblies being disposed perpendicular to and intersecting longitudinal axis 16 of the probe. The axles 56 and 57 of assemblies 19 and 20 extend perpendicular to and intersect axis 16 and are offset ninety degrees from one another about axis 16, so that their spin axes are similarly offset ninety degrees with respect to one another. Axle 56 may be parallel to axle 50, and axle 57 may be parallel to axle 32.

The manner in which gyroscope assembly 18 responds to pivotal movement about axis 35 with case 15 has been discussed. The assembly 17 similarly responds to pivotal movement of its axle 50 with case 15 about an axis 60 extending perpendicular to the axle at its center, causing precessing pivotal movement about axis 51. Assembly 19 responds to pivotal movement of its axle 56 about longitudinal axis 16 of the probe, to produce precessing movement about an axis 61, while assembly 20 responds to pivotal movement with the case about longitudinal axis 16 to produce precessing movement about an axis 62.

The three gyroscope assemblies 17, 18 and 19 thus respond to three different components of the earth's rotation applied thereto through case 15, and about axes 60, 35 and 16 respectively. The three gravity sensing elements 21, 22 and 23 similarly respond to three different components of gravity. For example, sensor 21 responds to a gravity component along an axis 63 which is disposed perpendicular to and intersects axis 16 and is parallel to the sensing axis 35 of gyro assembly 18. Similarly, the second gravity sensor 22 responds to a component of gravity along an axis 64 perpendicular to and intersecting axis 16 and parallel to sensing axis 60 of gyro 17. The third gravity sensor 23 responds to a component of gravity along longitudinal axis 16 of the probe.

All of the direction and gravity sensors 17, 18, 19, 20, 21, 22 and 23 produce electrical outputs which result in the development in electronic package 24 of signals representing the values of the sensed direction or gravity components. Those signals are delivered to line 13 in multiplexed fashion, desirably in pulse width modulation form, for delivery to the surface of the earth.

At the surface, the signals are separated by de-multiplexer 65, which produces individual signals in separate lines 66, 67, 68, 69, 70, 71 and 72 representing in analogue form the direction and gravity components sensed by the sensors 17 through 23 respectively. These sensed components can be displayed individually at 73 on a read-out unit 74, under the control of a manually actuated selector switch 75 operable in different settings to produce at 73 indications of the seven sensed values. The outputs from lines 66 through 72 may also be delivered to a computer or data processing unit 76 which may electronically perform computations deriving from the component signals the actual inclination of probe 10 and the azimuth or direction of that inclination. The computed inclination and azimuth values may be indicated on a read-out unit 77 at 78 and 79 respectively.

The de-multiplexed signals in lines 66 and 67 representing the components of the earth's rotation sensed by units 17 and 18 respectively may also be utilized for indicating the "tool face" angle of probe 11, that is, the angle through which the probe is turned about its longitudinal axis 16 from a position in which a predetermined portion of the probe case is facing North. To achieve this indication, the outputs from lines 66 and 67 may act through a null circuit 81 to control a motor 82 acting to drive the rotor of a resolver 83 and a pointer 84 connected to the rotor to a position indicating on a scale 85 the vector sum of the outputs of gyro assemblies 17 and 18. Feedback from the resolver 83 through a line 86 acts through null circuit 81 to always maintain the setting of the rotor of resolver 83 and pointer 84 in a position corresponding to the vector sum of the outputs of assemblies 17 and 18.

In using the described apparatus, probe 10 is first lowered into the well to a level at which survey information is desired. The rotors of the gyros are all caged during lowering of the probe, and remain caged for a short interval after the probe reaches the desired level in order to allow the gyros to settle. With the instrument stopped, the gyros are uncaged, and are permitted to precess in response to the different components of the earth's rotation, which act through case 15 to pivot the different rotors in inertial space about their respective sensing axes. Electronic package 24 produces a multiplexed output in line 13 containing signals representing the outputs of all seven sensors 17 through 23, which signals are de-multiplexed at 65 on the surface of the earth, and act to produce indications at 78 and 79 of the actual inclination of the probe and the direction of that inclination. The "tool face" angle is also indicated by resolver 83. In addition, the gravity and direction components sensed by units 17 through 23 respectively can be displayed individually at 73 on unit 74, to provide all of the information necessary for performing surveying calculations manually.

The mathematical analysis which may be performed manually in developing inclination and azimuth information from the component values displayed at 73 on unit 74, or which may be performed electronically in unit 76 to indicate the inclination and azimuth at 78 and 79, will be set forth briefly below. In this discussion, the values of the various directional components sensed by gyro units 17, 18, 19 and 20 are identified as $\psi_1, \psi_2, \psi_3$ and $\psi_4$, while the values of the gravity components sensed by units 21, 22 and 23 are identified as $\Delta_1, \Delta_2$ and $\Delta_3$ respectively.

Earth Rotation = WE ≅ 15°/hour
Vertical Component = WEH = WE sin λ
Horizontal Component = WEV = WE cos λ
$\phi$ = high side angle = $\tan^{-1}(\Delta_2/\Delta_1)$
$\theta$ = hole inclination from $$\text{vertical} = \sin^{-1}\frac{\sqrt{\Delta_1^2 + \Delta_2^2}}{\Delta_o}$$

$$= \tan^{-1}\frac{\sqrt{\Delta_1^2 \Delta_2^2}}{\Delta_3} = \cos^{-1}\frac{\Delta_3}{\Delta_o}$$

$\Delta_0$ = Earth Gravity
λ = Latitude at well site
Rotate $\psi_1 \psi_2$ by angle $\phi$
$\psi_1' = \psi_1 \cos\phi + \psi_2 \sin\phi$
$\psi_2' = \psi_2 \cos\phi - \psi_1 \sin\phi$ ($\psi_2'$ is horizontal)
$\psi_1''$ is $\psi_1'$ rotated to horizontal by subtracting the $\psi_H$ (WEH) influence and correcting for the angle $\theta$ $$\Psi''_1 = \frac{\Psi' - W_e \sin\lambda \sin\theta}{\cos\theta}$$

$$\alpha = \text{hole azimuth true} = \tan^{-1}\frac{\Psi'_2}{\Psi''_1}$$

$$= \sin^{-1}\frac{\Psi'_2}{W_E \cos\lambda} = \cos^{-1}\frac{\Psi''_1}{W_E \cos\lambda}$$

Utilizing an optical pick off which detects the time from uncaging to a fixed angular displacement in the precession direction we have:

$\psi_1 = K_1/t_1$
$\psi_2 = K_2/t_2$
$\psi_3 = K_3/t_3$
$\psi_4 = K_4/t_4$ $$K \approx \frac{2 \alpha J_\alpha}{h_w}$$

$\alpha$ = angular displacement
$J_\alpha$ = moment of inertia about precession axis
$h_w$ = moment of inertia about spin axis times spin rate
$\psi_3' = \psi_3 \cos\phi + \psi_4 \sin\phi$
$\psi_4' = \psi_4 \cos\phi - \psi_3 \sin\phi$ ($\psi_4'$ is horizontal, not used)

$$\Psi''_3 = \frac{\Psi'_3 - W_E \sin\lambda \cos\theta}{\sin\theta}$$

$$\alpha = \text{hole azimuth true} = \tan^{-1}\frac{\Psi'_2}{\Psi''_3}$$

-continued
$$= \sin^{-1}\frac{\Psi'_2}{W_E \cos\lambda} = \cos^{-1}\frac{\Psi''_3}{W_E \cos\lambda}$$

Use $\psi_4''$ if cos θ is greater than sin θ
Use $\psi_3''$ if sin θ is greater than cos θ

In order to increase the overall accuracy of the survey, and eliminate or compensate for inaccuracies or offsets in the readings produced by the different sensors, several sets of data may be taken at each location in the well, with the probe being turned about its axis 16 to different positions for the different readings. For example, a first set of values for the outputs of the different sensors may be taken in an initial position of the probe, following which the probe may be turned about its axis 16 through 90 degrees to take a second set of values in that condition, after which the probe can be turned through another angle of ninety degrees to take a third set of values, and then a final angle of ninety degrees to take a fourth set of values. The four readings for each direction or gravity component can be averaged, and the resulting average values be used in the survey calculations.

FIGS. 5 and 6 illustrate an arrangement utilizing an instrument embodying the present invention as a steering tool for determining the position to which a drill string should be turned in order to drill a hole in a predetermined direction. In FIG. 5, there is represented at 87 a directional drilling string positioned within a well bore 88. The drill string carries at its lower end a bent sub 89 having a lower portion 90 disposed at a slight angle relative to the upper portion 91 of the bent sub in order to cause gradual advancement of the drilled hole laterally as it advances downwardly. A drilling unit 92 is connected to the lower end of the bent sub and includes a motor 93 which drives a bit 94 rotatively to drill the hole. The motor may be driven by the pressure of mud pumped downwardly through the string, or in any other manner. The drill string itself does not rotate during the drilling operation.

Positioned within the drill string at a location above the bent sub is a steering tool 10a which may be identical with the instrument 10 of FIGS. 1 through 4 except that the steering tool or instrument 10a is retained against rotation relative to string 87, in order to enable use of tool 10 for indicating the position to which the drill string is turned about the longitudinal axis 95 of that string. For thus securing tool 10a against rotation within the string, the body of the tool may carry at its lower end a conventional mule shoe 96 having a lug 97 containing a vertical groove within which a projection 98 extending inwardly from a sidewall 99 of a section of the drill string is received. When instrument 10a is lowered into the drill string on a wire line 100, mule shoe 96 interfits with and forms a connection with projection 98 acting to hold instrument 10a in a position in which its longitudinal axis is aligned with the longitudinal axis of the surrounding portion of the drill string and in which instrument 10a is retained against rotation from a position of fixed orientation relative to the drill string.

The readout equipment 101 at the surface of the earth in FIG. 5 is typically illustrated as including the same surface readout units as are shown in FIG. 1. De-multiplexer 65a, null circuit 81a, motor 82a, and resolver 83a correspond to units 65, 81, 82, and 83 of FIG. 1 and act to cause pointer 84a to indicate on scale 85a the angle to which the case of steering tool 10a and the connected bent sub 89 and drilling unit 92 are turned with respect to true North. By turning the string to a position in which this tool face angle indicates a desired drilling direction, an operator can accurately control the direction in which the hole is drilled. As in the first form of the invention, the individual direction and inclination components can be read out on unit 14a, and the actual inclination and azimuth of that inclination can be displayed on unit 77a.

While certain specific embodiments of the present invention have been disclosed as typical, the invention is of course not limited to these particular forms, but rather is applicable broadly to all such variations as fall within the scope of the appended claims.

I claim:
1. The combination comprising:
 a body;
 a gyroscopic rotor carried by said body and driven rotatively relative thereto about a spin axis;
 a connection mounting said rotor to said body in a relation transmitting pivotal movement about a sensing axis through the body to the rotor and enabling precessing movement of the rotor relative to the body about an axis of precession in response to said pivotal movement about the sensing axis;
 a caging means for retaining said rotor against precessing movement from an initial position and releasable to free the rotor for precessing movement;
 means for timing the interval during which said rotor precesses from said initial position to another position, and
 means for deriving an indication of the rate of precession from the time required for said precession.

2. A well instrument comprising:
 a body adapted to be lowered into a well;
 first and second gryoscopic rotors carried by said body and each driven rotatively relative thereto about a spin axis;
 connections mounting said rotors to said body in a relation transmitting pivotal movements about two different sensing axes corresponding to two different components of the earth's rotation through the body to the rotors respectively in directions to cause precession of the rotors; said connections mounting said rotors for pivotal precessing movement relative to the body about two different axes of precession respectively in response to said two pivotal movements about said sensing axes; and
 means operable to determine the rate of precession of each rotor by measuring an interval of time during which it precesses as a result of the earth's rotation and the extent of precessing movement during that interval, and operable to produce from said derived rates an indication or indications dependent upon said components of the earth's rotation.

3. A well instrument as recited in claim 2, in which said two axes of precession about which said rotors are pivotally movable extend essentially transversely of a well when said body is lowered thereinto and are offset from one another approximately ninety degrees with respect to the axis of the well.

4. A well instrument as recited in claim 2, including at least one additional gyroscopic rotor carried by the body and driven rotatively relative thereto about a spin axis different than that of either of said first and second rotors and mounted to precess about an axis of precession relative to the body in response to a third component of the earth's rotation.

5. A well instrument as recited in claim 2, in which said means are operable to derive azimuth from said rates of pivotal precessing movement of said two rotors representing said two components of the earth's rotation.

6. A well instrument as recited in claim 2, in which said means are responsive to time measurements upon attainment of a predetermined angle of precession by each of said rotors to produce an output dependent upon the rates of precession of the rotors.

7. A well instrument as recited in claim 2, in which said means include means for retaining said rotors against said pivotal precessing movement and then simultaneously releasing the rotors for precession to simultaneously commence said interval of time for both rotors.

8. A well instrument as recited in claim 2, in which said spin axes of the two rotors in one condition extend in the same direction and longitudinally of the well.

9. A well instrument as recited in claim 2, in which said body is an elongated structure adapted to extend longitudinally within a well bore, said means being operable to retain said rotors in a position in which their spin axes extend longitudinally of said body and the well bore, and then free the rotors simultaneously to enable comparison of their rates of precession.

10. A well instrument as recited in claim 2, in which said means include a series of circularly spaced markings on each of said rotors which rotate about the spin axis of the rotor as it turns, and means responsive to said markings to sense the extent of precession of the rotors.

11. A well instrument as recited in claim 2, in which said means include a face which turns with each rotor about its spin axis and has a pattern of visually differing areas about the spin axis, and means for optically scanning said visually differing areas to sense the extent of precession of the rotors.

12. A well instrument as recited in claim 2, in which said means include patterns of circularly spaced visually differing areas turning with each rotor about its spin axis, and lamp and photocell means positioned to scan said visually differing areas and sense when precession of either rotor has continued to a point at which the lamp and photocell means are beyond said pattern to thereby sense the extent of precession of the rotors.

13. A well instrument as recited in claim 2, including gravity actuated sensing means responsive to changes in the inclination of said body, said means of claim 2 being responsive to said gravity actuated sensing means as well as said rates of precession to produce survey information.

14. A well instrument as recited in claim 2, including gravity actuated sensors responsive to different components of inclination, said means including indicator means at the surface of the earth responsive to the relative rates of precession of said rotors and to said gravity actuated sensors to produce indications from which the inclination of the well and the direction of that inclination can be derived.

15. A well instrument as recited in claim 2, in which said body is an elongated structure adapted to extend longitudinally within a well bore; said means including gyro caging apparatus for releasably retaining said rotors in a position in which their spin axes extend longitudinally of said body and the well bore, and then freeing the rotors simultaneously for precession; said two axes of precession about which said rotors are pivotably movable extending transversely of said body and being offset ninety degrees about the well axis relative to one another; said connections being constructed to prevent precession of each of said rotors about any axis other than the corresponding one of said axis of precession; there being gravity actuated sensing means responsive to changes in inclination; and said means being responsive to said gravity actuated sensing means as well as said rates of precession to produce outputs from which the inclination of the well and the direction of that inclination can be derived.

16. A well instrument as recited in claim 15, in which said means include a pattern of markings on said rotors at different locations about their spin axes, lamp means for illuminating said markings, and means for optically sensing said markings and responsive to arrival of said rotors at predetermined angles of precession.

17. A well instrument as recited in claim 15, including two additional gyroscopic rotors connected to said body in a relation transmitting through the bodies to the rotors pivotal movements about two transverse and mutually essentially perpendicular sensing axes respectively and mounted for pivotal precessing movement relative to the body about two different axes of precession respectively in responsive to said two pivotal movements respectively, caging means for releasably retaining said additional rotors in positions in which spin axes thereof extend transversely of said body and essentially perpendicular to one another and then simultaneously releasing said additional rotors for precessing movement, there being means responsive to the relative rates of precession of said additional rotors to produce survey information.

18. A well instrument as recited in claim 2, in which said body is received within a string of well pipe, there being means for retaining said body against rotary movement relative to the well pipe string from a predetermined relative rotary setting.

19. The combination comprising a well instrument as recited in claim 2, and a directional drilling string containing said instrument, there being interfitting connector elements on the directional drilling string and instrument maintaining the latter in a predetermined rotary position relative to the string so that information derived from said gyroscopic rotors can indicate the direction in which said string is aimed.

20. The combination as recited in claim 19, in which said means include means at the surface of the earth operable to indicate the direction in which a predetermined side of said directional string faces.

21. The method that includes:
lowering into a well an instrument including a body and at least two gyroscopic rotors each driven about a spin axis;
initially retaining said rotors against precession from predetermined positions;
then releasing said rotors for precession about different axes in response to pivotal movements about two different sensing axes corresponding to two different components of the earth's rotation;
deriving directional information from the relative rates of precessing movement of said rotors;
said last step including determining the time when each rotor has precessed through a predetermined angle; and
deriving the relative rates of precession of the rotors from differences in said precession time.

* * * * *